April 28, 1970 D. ARLEN 3,509,472
LOW FREQUENCY PULSE GENERATOR
Filed Nov. 16, 1967

INVENTOR.
DAVID ARLEN
BY
H P Terry
ATTORNEY

United States Patent Office 3,509,472
Patented Apr. 28, 1970

3,509,472
LOW FREQUENCY PULSE GENERATOR

David Arlen, Jericho, N.Y., assignor to Sperry Rand Corporation, a corporation of Delaware Filed Nov. 16, 1967, Ser. No. 683,540
Int. Cl. H03k 3/78, 17/26
U.S. Cl. 328—63 5 Claims

ABSTRACT OF THE DISCLOSURE

Apparatus for generating a low frequency pulse train whose pulses occur synchronously with the pulses of a high frequency clock pulse source wherein only one pulse occurs for each cycle of a low frequency reference sinusoid.

BACKGROUND OF THE INVENTION

(1) Field of the invention

The present invention pertains to low frequency pulse generating apparatus applicable for use in digital control systems and in digital computers. The present invention is particularly applicable for use in traffic control systems such as in traffic intersection controllers of the type shown in U.S. patent application S.N. 453,072 entitled "Traffic Intersection and Other Signal Controllers Responsive to a Cyclic Pulse Train," invented by John J. King and filed May 4, 1965 and now abandoned.

(2) Description of the prior art

The present invention is an improvement over the pulse generator disclosed in U.S. patent application S.N. 510,517, now Patent No. 3,379,980, entitled "Pulse Generator," invented by John J. King and filed Nov. 30, 1965. The present invention utilizes less equipment as well as less expensive components, has a higher noise immunity, and also eliminates a race problem which can occur with respect to the device disclosed in said U.S. patent application S.N. 510,517.

SUMMARY OF THE INVENTION

The present invention utilizes a minimum of equipment to combine a sixty cycle power input with a high frequency three-phase clock source to generate a sixty cycle per second pulse train whose pulses occur simultaneously with specified clock pulses of the clock source which may be utilized for low frequency counting purposes.

DESCRIPTION OF THE PREFERRED EMBODIMENT

Figure 1:
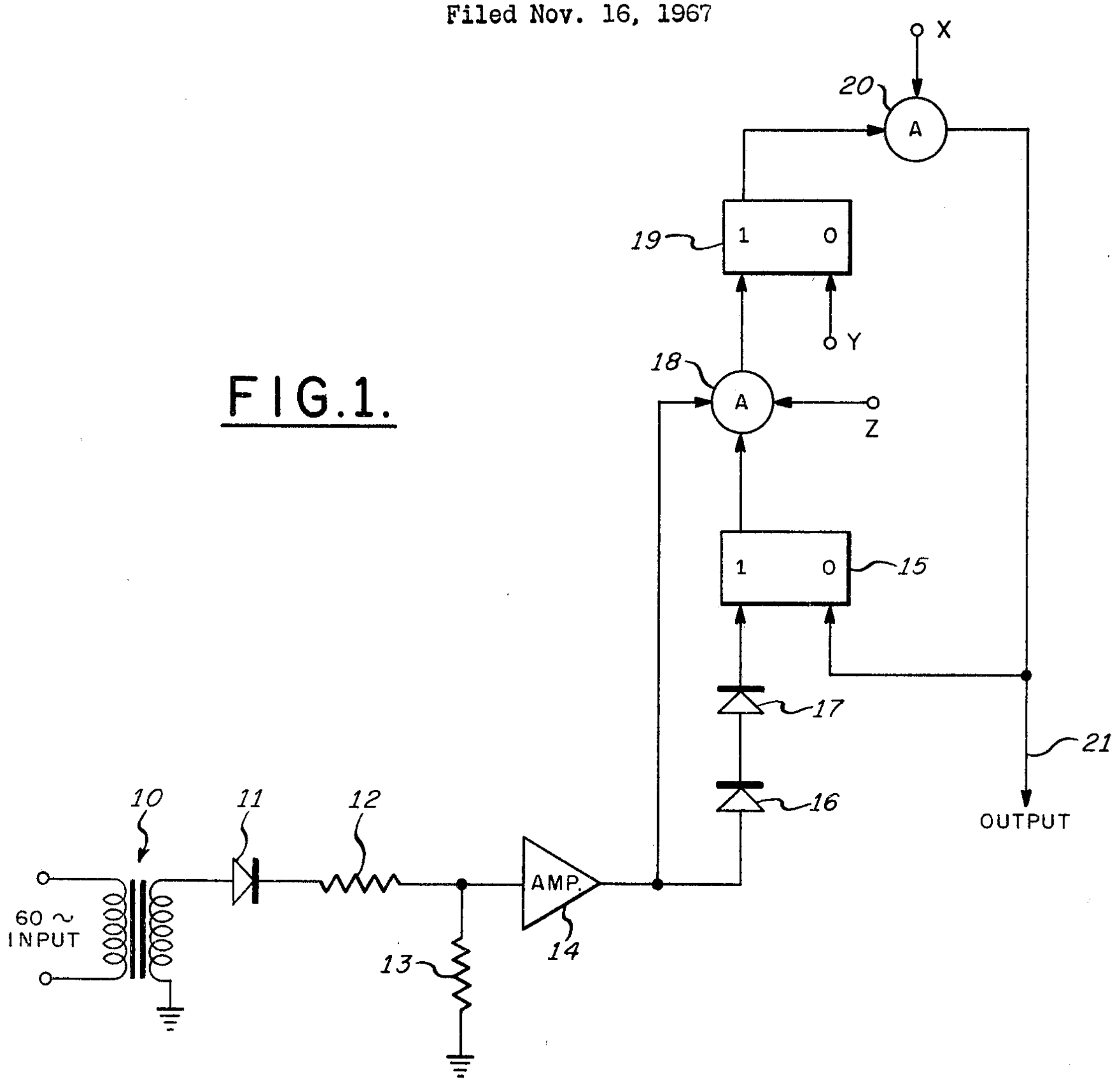
FIG. 1 is an electrical schematic diagram of the present invention.

Referring now to FIG. 1, a reference input sixty cycle sine wave as indicated by the legend is connected to the primary of a transformer 10 which has one terminal of its secondary connected to a diode 11 while the other terminal is connected to ground potential. The output of the diode 11 is connected through a series resistor 12 and across a parallel resistor 13 to the input of an amplifier 14. The other extremity of the parallel resistor 13 is connected to ground potential. The output of the amplifier 14 is connected to SET the input terminal of a flip-flop 15 through series connected diodes 16 and 17. The output of the amplifier 14 is also connected to an input terminal of an AND gate 18. The binary ONE or SET output terminal of the flip-flop 15 is connected to another input terminal of the AND gate 18. The remaining input terminal of the AND gate 18 is responsive to the Z clock pulses of a high frequency three-phase clock source. The output terminal of the AND gate 18 is connected to the SET input terminal of a flip-flop 19 which has its binary ZERO or RESET input terminal responsive to the Y clock pulses of the aforementioned high frequency three-phase clock source. The binary ONE or SET output terminal of the flip-flop 19 is connected to an input terminal of an AND gate 20 which has its other input terminal responsive to the X clock pulses of the same high frequency three-phase clock source. The output terminal of the AND gate 20 is connected to the RESET input terminal of the flip-flop 15 and also provides a sixty pulse per second output signal on the output lead 21.

Figure 2:
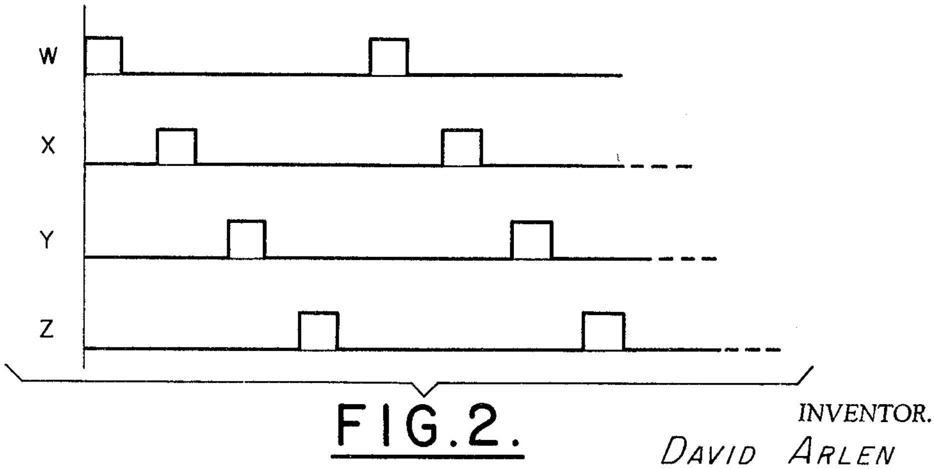
FIG. 2 is a graph showing the relationship of the clock pulses of the high frequency three-phase clock source.

As more fully explained in said U.S. patent application S.N. 453,072, there are four clock pulse signals designated W, X, Y and Z being continuously generated by the system. Each clock pulse as shown in FIG. 2 is on for 50 milliseconds with a 50 millisecond guard time between any two pulses.

In operation, the diodes 11, 16 and 17 are so poled as to allow only the positive portion of the input sixty cycle sine wave to pass. The resistors 12 and 13 and the amplifier 14 act as a buffer network which shapes the positive portion of the sixty cycle per second input signals, changes the driving impedance to be compatible with the operating impedance of the remainder of the circuit and enhances the input signals with respect to the input noise.

The diodes 16 and 17 function as threshold adjusters to insure that the sensitivity of the flip-flop 15 is controlled with respect to that of the AND gate 18. The diodes 16 and 17 are designed such that the voltage at the input of the diode 16 must rise to the normal energizing or setting voltage of the flip-flop 15 plus the forward voltage drops of the diodes 16 and 17 before the flip-flop 15 can be set. Thus, as the sixty cycle sine wave changes polarity, the output of the amplifier 14 changes state and the diodes 16 and 17 insure that the AND gate 18 responds to the change before the flip-flop 15. This insures that the AND gate 18 is disabled before the flip-flop 15 is set, when the amplifier 14 changes state. Thus the response time of the AND gates utilized in the circuit, measured as turn-on time, turn-off time, rise time and full-time of output and etc. is not required to be tightly specified with respect to the response time of the circuit flip-flops.

When the sine wave input signal from amplifier 14 reaches the threshold established by the diodes 16 and 17, the flip-flop 15 is set thereby providing a binary ONE output signal to the AND gate 18 which has its other input terminal energized by virtue of the positive voltage from the amplifier 14. As shown in FIG. 2, the first Z pulse appearing after the flip-flop 15 has been set to its binary ONE state, then passes through the AND gate 18 to set the flip-flop 19, thereby providing a binary ONE output signal to the AND gate 20. When the next X pulse occurs, it passes through the AND gate 20 to provide a sixty pulse per second output on the lead 21. The output signal from the AND gate 20 also resets the flip-flop 15 which now awaits the next positive excursion of the sixty cycle input signal to repeat the cycle. The Y pulse resets the flip-flop 19 to condition the circuit for the next occurring cycle of the input waveform.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. A low frequency pulse generator responsive to a low frequency reference sinusoid signal and to a high frequency clock source haxing X, Y and Z clock pulse signals comprising first flip-flop means having a SET input terminal responsive to certain portions of said reference sinusoid signal for providing first binary signals, first AND gate means having input terminals responsive to said certain portions of said reference sinusoid signal, said first binary signals and said Z clock pulse signals for providing a first AND signal when enabled, second flip-flop means having a SET input terminal responsive to said first AND signal for providing second binary signals and a RESET input terminal responsive to said Y clock pulse signals for resetting said second flip-flop means, and second AND gate means having input terminals responsive to said second binary signals and said X clock pulse signals for providing an output signal for each cycle of said low frequency reference sinusoid signal, said first flip-flop means having a RESET input terminal responsive to said output signal for conditioning said pulse generator for the next occurring cycle of said reference signal.

2. A pulse generator of the character recited in claim 1 and further including buffer network means responsive to said low frequency reference sinusoid signal for shaping said certain portions of said reference signal to be compatible with said pulse generator.

3. A pulse generator of the character recited in claim 2 and further including threshold adjusting means connected between said buffer network means and said first flip-flop means for controlling the sensitivity of said first flip-flop with respect to said first AND gate.

4. A pulse generator of the character recited in claim 3 in which said threshold adjusting means includes a pair of series connected diodes.

5. A pulse generator of the character recited in claim 1 in which said Z, X and Y clock pulses are sequentially effective in the recited order.

References Cited

UNITED STATES PATENTS

| | | | |
|---|---|---|---|
| 3,379,980 | 4/1968 | King | 328—63 |
| 3,395,353 | 7/1968 | King | 328—63 |

DONALD D. FORRER, Primary Examiner

S. D. MILLER, Assistant Examiner

U.S. Cl. X.R.

328—28; 307—260, 261, 269